United States Patent [19]

Mann, Jr.

[11] Patent Number: 4,481,005
[45] Date of Patent: Nov. 6, 1984

[54] CHAIN DRIVE SYSTEM

[75] Inventor: James A. Mann, Jr., Richardson, Tex.

[73] Assignee: McDonnell Douglas Corporation, Long Beach, Calif.

[21] Appl. No.: 418,626

[22] Filed: Sep. 16, 1982

[51] Int. Cl.³ .............................................. F16H 7/06
[52] U.S. Cl. ..................................... 474/139; 299/43; 474/148
[58] Field of Search ............... 474/139, 148, 150, 154, 474/203, 209; 105/29; 74/422; 299/43, 42

[56] References Cited

U.S. PATENT DOCUMENTS

| | | | |
|---|---|---|---|
| 3,400,540 | 9/1968 | Cresswell et al. | 474/139 X |
| 4,006,937 | 2/1977 | Curtis | 105/29 R X |
| 4,099,786 | 7/1978 | Nakajima et al. | 299/43 |
| 4,214,488 | 7/1980 | Conrad | 474/148 |
| 4,234,234 | 11/1980 | Sedlaczek et al. | 299/43 |
| 4,254,710 | 3/1981 | Guay | 105/29 R X |

Primary Examiner—Stephen J. Novosad
Assistant Examiner—Thuy M. Bui
Attorney, Agent, or Firm—Paul T. Loef; Donald L. Royer; George W. Finch

[57] ABSTRACT

A chain drive system (10) wherein the chain (12) includes a plurality of interconnected links (14) is provided. The chain drive system (10) includes a drive gear (28) for driving the chain (12). A rack (20) is provided and includes a plurality of spaced apart teeth (22) for engagement with the links (14) of the chain (12). Idler gears (38, 40) are provided for causing engagement between the chain (12) and the rack (20).

5 Claims, 6 Drawing Figures

CHAIN DRIVE SYSTEM

TECHNICAL FIELD

This invention relates to drive systems, and more particularly to a chain drive system in which chain stretch is minimized.

BACKGROUND ART

Rack and pinion gear arrangements have been utilized for the transformation of motion from one direction to another direction. For example, rotary motion produced by a motor may be transformed through a gearing arrangement of a rack and pinion gear to linear motion. Such gears, however, when used for moving large objects, require a large power source, add additional weight to the drive system, require lubrication and further require extensive maintenance.

Chain drive systems have been utilized as an alternative drive system for a rack and pinion gear arrangement. In such systems, a chain may form a loop around the object to be moved. The chain may be driven through a drive gear by a motor or other power source to in turn move the object. However, such systems, when utilized to move large objects, require great lengths of chain having stressed and unstressed portions. Since the chain is typically unsupported around the objects, the chain may not completely engage the object to be moved and if the chain is stressed in various amounts over its length, stretch of the chain occurs. The undesirable nature of chain stretch is readily apparent in that repetitive accurate movement of the object cannot be consistently achieved since the length of the chain varies. Additionally, as the chain permanently stretches, slack is introduced into the system which must be taken up by the driven gears before the object can be moved. This slack results in a delayed movement of the object after the drive system is actuated.

A need has thus arisen for a chain drive system in which relatively short load sections of chain can be utilized for moving large objects and wherein chain stretch is minimized. Additionally, a need has arisen for a chain drive system in which stress is minimized to reduce the load on the chain links.

DISCLOSURE OF THE INVENTION

In accordance with the present invention, a chain drive system is provided which substantially minimizes chain stretch and eliminates the problems heretofore associated with such drive systems.

In accordance with the present invention, a chain drive system is provided wherein the chain includes a plurality of interconnected links. The system includes a drive gear for driving the chain. A rack is provided which includes a plurality of spaced apart teeth. The rack is disposed adjacent the drive gear for engagement with the chain, such that a plurality of chain links are positioned between the teeth of the rack. Structure is provided for restraining the chain in the rack. The drive gear imparts motion to the chain for causing relative motion between the drive gear and the rack, such that the chain is positioned over the drive gear and between the restraining structure and the rack to thereby minimize unrestrained chain and minimize chain stretch.

BRIEF DESCRIPTION OF THE DRAWINGS

For a more complete understanding of the present invention and for further advantages thereof, reference is now made to the following Detailed Description, taken in conjunction with the accompanying Drawings in which.

DETAILED DESCRIPTION

Figure 1:
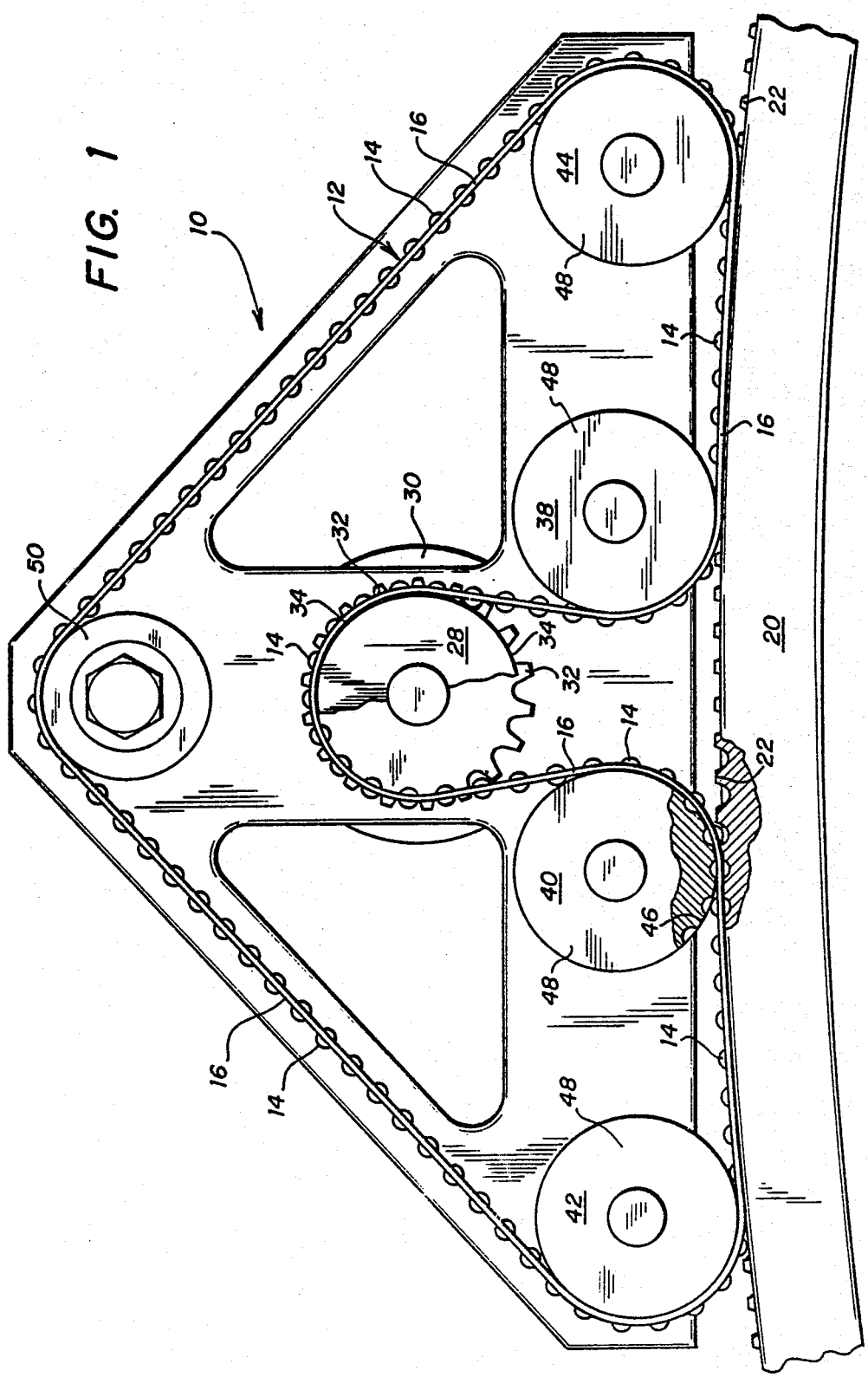
FIG. 1 is a plan view of an embodiment of the chain drive system of the present invention illustrating a circular rack.

Referring to FIG. 1, the present chain drive system is illustrated, and is generally identified by the numeral 10. Chain drive system 10 includes a chain 12 formed in a continuous loop. Chain 12 is composed of a plurality of links 14 interconnected by cables 16. Links 14 are shown for illustrative purposes only as being cylindrical and of a "ladder" type; however, additional type links can be utilized, such as a "ball" type. Links 14 may be comprised, for example, of urethane plastic which are molded to cables 16. Cables 16 are also enclosed in urethane plastic. Such a chain is manufactured and sold by Winfred M. Berg, Inc. of East Rockaway, N.Y. The present invention has particular use when using a plastic chain since such chains have a tendency to stretch under high loads and where large lengths to such chain are utilized in a drive system. Additionally, steel linked chain may be utilized in a chain drive system to benefit from the present invention.

Figure 3:
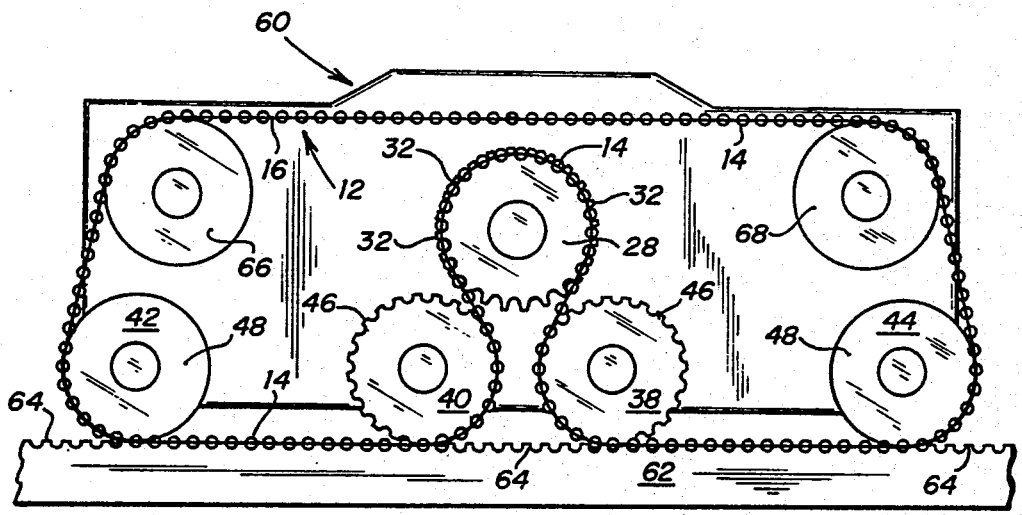
FIG. 3 is a side view of an embodiment of the present invention illustrating a flat rack.

An important aspect of the present invention is the use of chain 12 in a drive system in which the links 14 of chain 12 are engaged with a rack, generally identified by the numeral 20. Rack 20 includes teeth 22. The present invention minimizes unrestrained chain under stress to thereby prevent chain stretch and further uniformly distributes the load over the chain to minimize loading of the teeth of the rack and drive gear. The present drive system 10 imparts motion to the rack as illustrated in FIG. 1 or uses the rack to impart motion to the drive system as illustrated in FIG. 3, to be subsequently described. Chain 12 may be pretensioned prior to operation of chain drive system 10.

Chain drive system 10 includes a drive gear 28 driven by a drive motor 30. Drive gear 28 includes spaced apart teeth 32 and side shoulders 34. Teeth 32 engage chain 12 between links 14. Side shoulders 34 provide support for cables 16 such that when chain 12 is under load, cables 16 do not separate from links 14.

Chain 12 is disposed around drive gear 28 and idler gears 38, 40, 42 and 44. Idler gears 38, 40, 42 and 44 include teeth 46 which are shorter in length than teeth 32 of drive gear 28. Idler gears 38, 40, 42 and 44 further include shoulders 48. Idler gears 38, 40, 42 and 44 engage links 14 of chain 12 between teeth 46 while shoulders 48 support cables 16 of chain 12. A further idler gear 50 is provided for guiding chain 12. It therefore can be seen that chain 12 forms a continuous loop adjacent rack 20.

While five idler gears have been illustrated in the chain drive system 10 of FIG. 1, it will be understood that additional or fewer such idler gears may be utilized depending upon the particular application of the present chain drive system. For example, FIG. 2 illustrates an additional embodiment of the present chain drive system, generally identified by the numeral 52, wherein like reference numerals are utilized for like and corresponding components previously identified with respect to FIG. 1.

Figure 2:
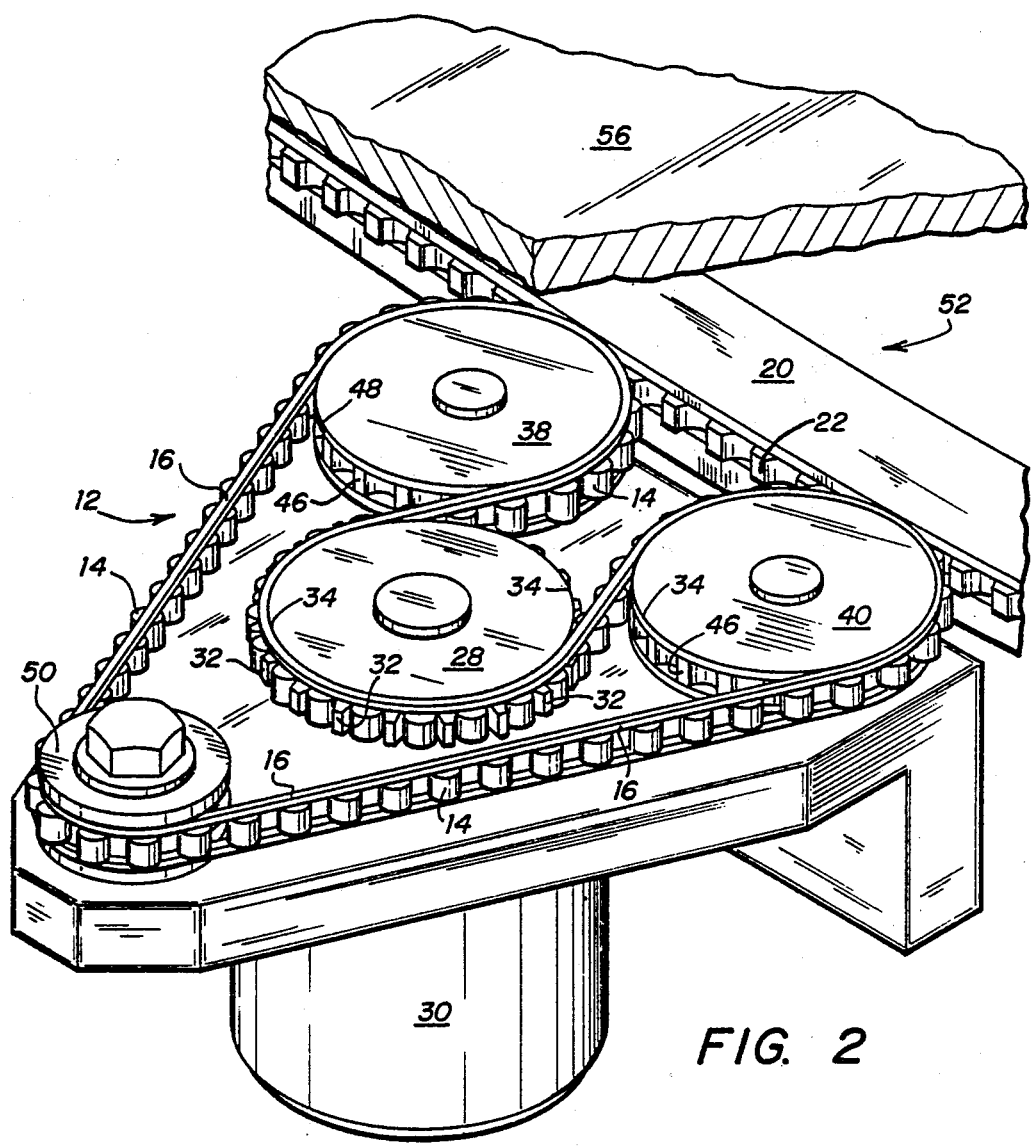
FIG. 2 is a perspective view of an embodiment of the present invention illustrating a circular rack.

Referring simultaneously to FIGS. 1 and 2, rack 20 is disposed adjacent idler gears 38, 40, 42 and 44. Rack 20 includes spaced apart teeth 22 for receiving links 14 of chain 12. Rack 20 (FIG. 2) supports a table 56. The resulting motion imparted by drive gear 28 to chain 12 is thereby imparted to rack 20 which in turn moves table 56. Idler gears 38, 40, 42 and 44 function to tension and restrain chain 12 in rack 20 between teeth 22.

An important aspect of the present chain drive system is that the primary stressed portions of chain 12 are substantially engaged with a sprocket or the rack to thereby prevent chain stretch. The portion of chain 12 which circumscribes drive gear 28 is stressed as well as that portion which engages idler gears 38, 40, 42 and 44 and rack 20. In drive system 10 (FIG. 1) a plurality of links 14 are disposed in rack 20 between idler gears 40 and 42 and idler gears 38 and 44. The increased number of links which engage rack 20 in drive system 10 function to distribute the load on chain 12 over a larger number of teeth 54 of rack 20 to thereby reduce individual link 14 stretch and reduce the possibility of breakage of links 14 of chain 12. It therefore can be seen that the only portion of nonrestrained chain 12 which is under load is that portion which lies between drive gear 28 and idler gears 38 and 40 which comprises a very small percentage of the total length of chain 12. By maintaining links 14 of chain 12 within rack 20, the exposed length of chain 12 is reduced to thereby minimize unrestrained chain and prevent chain stretch.

FIG. 3 illustrates an additional embodiment of the present chain drive system, generally identified by the numeral 60, wherein like reference numerals are utilized for like and corresponding components previously identified with respect to FIG. 1. Chain drive system 60 utilizes a flat rack 62 having teeth 64. Additional idler gears 66 and 68 are provided in drive system 60. The operation of chain drive system 60 is similar to that previously described with respect to chain drive systems 10 and 52 wherein the exposed length of chain 12 is minimized to prevent chain stretch.

Chain drive system 60 may also be configured such that chain 14 continuously engages the entire length of rack 62, except for the length between idler gears 40 and 38, in an open-loop configuration instead of the closed-loop shown in FIG. 3. In such a system, idler gears 42, 44, 66 and 68 are eliminated and chain 14 is fixed at its ends to rack 62.

Figure 4:
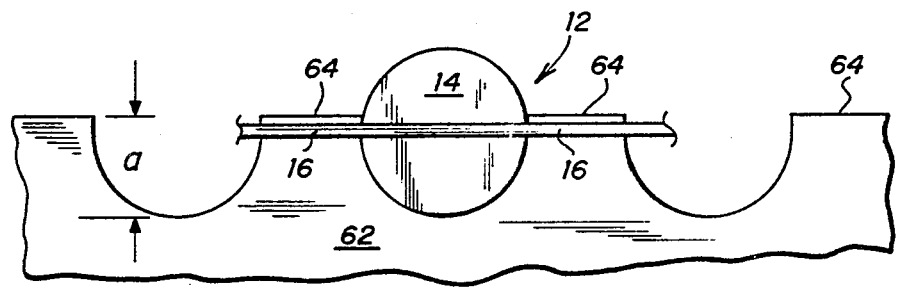
FIG. 4 is an enlarged side view of the rack shown in FIG. 3 of the present invention.

FIG. 4 illustrates a portion of rack 62 and the engagement of rack 62 with a link 14 of chain 12. Teeth 64 of rack 62 are fabricated such that the distance between the top of a tooth 64 and the bottom of the space created between adjacent teeth 64 (reference letter "a") is greater than one half of the diameter of a link 14. This offset in rack 62 allows the link 14 to be firmly held within the space created between adjacent teeth 64 since more than one half the circumference of a link 14 is received by rack 62. Chain 12 therefore does not "jump" teeth 64 of rack 62 when links 14 engage rack 62. The length of teeth 46 of idler gears 38, 40, 42 and 44 are sized to mate with the height of teeth 64 of rack 62.

Figure 5:
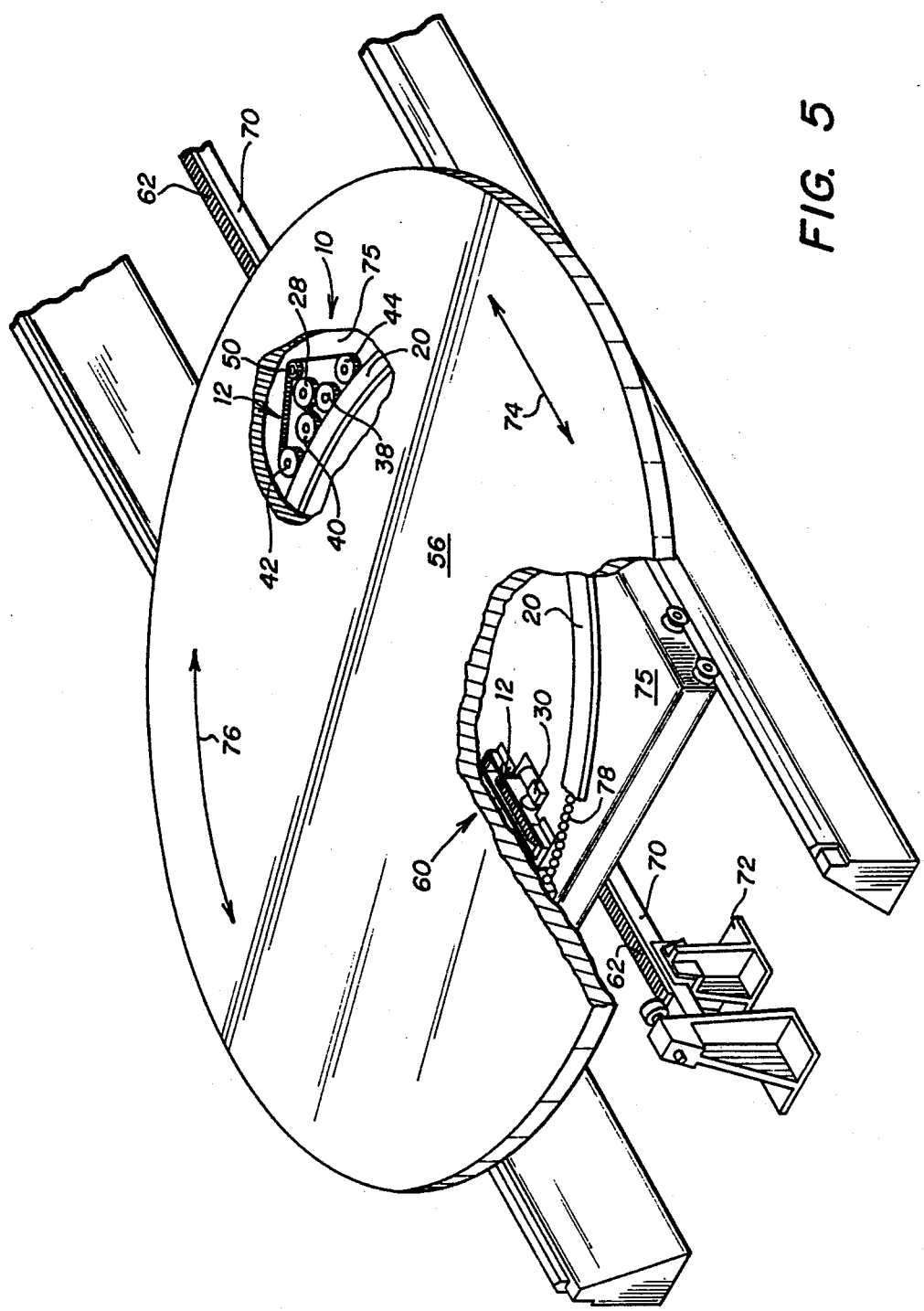
FIG. 5 is a perspective view of a table whose movement is controlled by the present chain drive systems illustrated in FIGS. 1 and 3.

FIG. 5 illustrates a use of chain drive systems 10 and 60 to move table 56. Rack 62 is mounted to a beam 70 which is supported by supports 72. Chain drive system 60 is mounted to the underside of table 56 for movement along rack 62 to thereby impart linear motion to table 56 in the directions indicated by arrow 74. Chain drive system 10 is mounted to a subframe 75 which is mounted to the underside of table 56 for imparting rotational motion to table 56 through rack 20. Rack 20 is mounted to the underside of table 56. Chain drive system 10 is fixed with respect to the motion of table 56 whereas chain drive system 60 moves with table 56. The rotational motion of table 56 is indicated by arrow 76. Rack 20 is supported by bearings 78.

Figure 6:
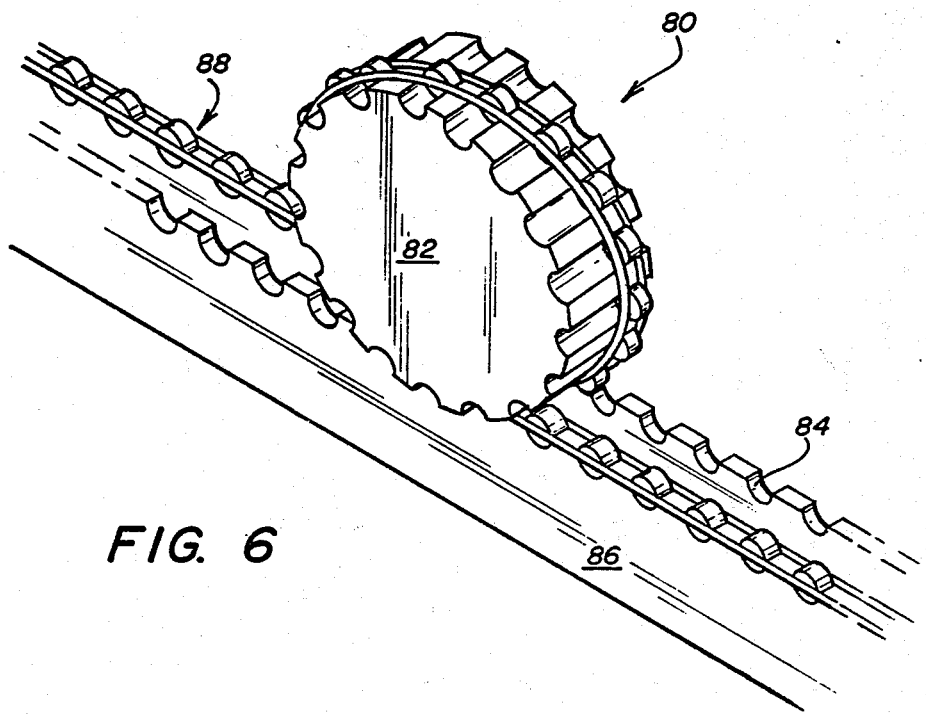
FIG. 6 is a perspective view of a further embodiment of the present chain drive system.

FIG. 6 illustrates a further embodiment of the present invention, and is generally identified by the numeral 80. Chain drive system 80 includes a drive gear 82 and parallel racks 84 and 86. A chain 88 circumscribes drive gear 82 such that a portion of chain 88 lies within both racks 84 and 86. Chain drive system 80 eliminates the need for idler gears for guiding chain 88 into racks 84 and 86 since this function is performed directly by drive gear 82. Chain drive system 80 thereby further eliminates exposed chain length to minimize chain stretch.

It therefore can be seen that the present chain drive system utilizing a rack to impart motion to an object minimizes unrestrained chain under stress to thereby prevent chain stretch. While only a single chain has been illustrated in the present chain drive systems, it will be understood that multiple chain loops positioned parallel to each other can be utilized to carry out the purposes of the present invention. In such applications, multiple drive and idler gears would be utilized as well as wider racks to accommodate the plural chain loops.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A chain drive system wherein the chain includes a plurality of links interconnected by cables to form a continuous loop comprising:

drive gear means positioned within the chain loop for driving the chain, the chain being disposed around a portion of said drive gear means;

rack means having a plurality of spaced apart teeth for receiving the links of the chain, said rack means being disposed outside the chain loop and adjacent said drive gear means, such that two portions of the plurality of chain links are positioned between said plurality of teeth of said rack means and on either side of the drive gear means;

idler gear mean disposed substantially symmetrically relative to the drive gear means for restraining the portions of the chain within said rack means, the idler gear means having cog recesses therein to receive the links of the chain; and said drive gear means imparting motion to the chain for causing relative motion between said drive gear means and said rack means, such that the chain is tensioned over said portion of said drive gear means and between said idler gear means and said rack means such that the length of the chain which is unsupported between the drive gear means and the nearest idler gear means to either side is less than one half the sum of the circumferences of the drive gear means and the nearest idler gear means to thereby minimize unrestrained chain and minimize chain stretch.

2. The chain drive system of claim 1 and further including:

support means interconnected to said drive gear means and to said idler gear means for supporting the chain cables.

3. The chain drive system of claim 1 wherein the height of said teeth of said rack means are greater than approximately one half the height of the chain links.

4. The chain drive system of claim 1 wherein said drive gear means further includes means for tensioning the chain within said rack means.

5. A chain drive system wherein the chain includes a plurality of interconnected links comprising:

drive gear means for driving the chain, the chain circumscribing said drive gear in an open loop having spaced apart ends;

first and second rack means disposed parallel to one another and having a plurality of spaced apart teeth, said first and second rack means being disposed adjacent said drive gear means for engagement with said chain loop around said drive gear means, such that the plurality of chain links are positioned between said teeth of said first and second rack means; and said drive gear means imparting motion to the chain for causing relative motion between said drive gear means and said first and second rack means, such that the chain is tensioned between said drive gear means and said first and second rack means to thereby minimize unrestrained chain and minimize chain stretch.

* * * * *